United States Patent [19]

Scherz

[11] 4,180,886
[45] Jan. 1, 1980

[54] WINDSHIELD WIPER SYSTEM

[76] Inventor: Wilhelm Scherz, Bergwerkstr. 5, D7180 Crailsheim, Fed. Rep. of Germany

[21] Appl. No.: 928,915

[22] Filed: Jul. 28, 1978

[30] Foreign Application Priority Data

Aug. 1, 1977 [DE] Fed. Rep. of Germany ....... 2734637

[51] Int. Cl.² ............................................. B60S 1/46
[52] U.S. Cl. ...................... 15/250.04; 134/1; 134/184
[58] Field of Search ............... 15/250.01–250.04, 15/103; 134/1, 6, 184

[56] References Cited

U.S. PATENT DOCUMENTS 3,716,886  2/1973  Klomp ................................ 15/250.04

FOREIGN PATENT DOCUMENTS

| | | | |
|---|---|---|---|
| 693496 | 7/1940 | Fed. Rep. of Germany ........ | 15/250.04 |
| 2003912 | 8/1971 | Fed. Rep. of Germany . | |
| 1417337 | 10/1965 | France ................................. | 15/250.04 |
| 208906 | 2/1968 | U.S.S.R. ................................... | 134/184 |

OTHER PUBLICATIONS

*VDI-Zeitschrift*, vol. 110, Jul. 1968, pp. 781 to 784.

*Primary Examiner*—Peter Feldman
*Attorney, Agent, or Firm*—Fred Philpitt

[57] ABSTRACT

A windshield wiper system comprises a wiper blade having two wiper lips extending in spaced parallel relationship. The wiper lips are interconnected at the ends thereof by further wiper lip portions to define a continuous seal cooperating with the surface of the windshield to be cleaned to define an essentially closed cavity. The latter communicates with cleaning liquid supply means adapted to completely fill said cavity and establish a positive pressure therein. An ultrasonic transducer assembly is acoustically coupled to the surface of the windshield by the mass of water contained in the cavity. By moving the wiper blade together with the ultrasonic transducer assembly across the windshield the dirt clinging to the surface of the windshield becomes detached and suspended in the cleaning liquid. Thus the dirt is most effectively removed.

4 Claims, 5 Drawing Figures

WINDSHIELD WIPER SYSTEM

The present invention relates to a windshield wiper system comprising wiper blade means including two spaced wiper lips extending in essentially parallel direction and comprising cleaning liquid supply means having a discharge opening communicating with the space defined between the wiper lips.

Such a windshield wiper system has been disclosed in German Offenlegungsschrift No. 20 03 912. In this known system a cleaning liquid supply channel is formed in a main body of the wiper blade carrying the two wiper lips in spaced parallel relation-ship. The cleaning liquid supply channel includes a plurality of longitudinally spaced nozzles each providing a jet of cleaning liquid into the space defined between the wiper lips. Thus all the cleaning liquid supplied will be effectively directed to the windshield ahead of one of the wiper lips in either direction of movement of the wiper blade.

In this known windshield wiper system removal of dirt is merely mechanical. Especially in the beginning of an operating phase when the dirt, particularly flies, strongly adheres to the surface of the windshield, only a very limited cleaning action is obtained. Also small particles formed by the normal abrasion of tires are difficult to remove.

It is also known to use ultrasonic waves in cleaning windows. A corresponding device including a generator for ultrasonic waves has been described in VDI-Zeitschrift, vol. 110 (1968; pages 781 to 784). This known device comprises a circular seal made from rubber to seal a cavity filled with cleaning liquid with respect to the surface to be cleaned. This known device cannot be used for cleaning the windshield of a motor vehicle, since the seal ring being in surface contact with the window will require a larger force to move the device across the surface to be cleaned than can be provided by usual wiper drive motors. Also the windshield would not be properly cleaned, since part of the cleaning liquid will remain on the surface of the windshield just as in the case of a worn wiper blade having no sharp wiping edge.

Thus the main object of the present invention is to provide a windshield wiper system of the kind disclosed in German Offenlegungsschrift No. 20 03 912, which will clean the windshield more thoroughly.

To this end the present invention provides for a windshield wiper system of the kind referred to above being characterized in that the two spaced wiper lips are interconnected at the ends thereof to form a continuous seal lip of elongated oval shape cooperating with the windshield to be cleaned to define an essentially closed cavity, in that the cleaning liquid supply means provides a mass of cleaning liquid to the cavity essentially filling the latter and being under positive pressure, and in that a generator for ultrasonic waves communicates with the cleaning liquid contained in the cavity.

With the windshield wiper system in accordance with the present invention only small forces are required to move the wiper blade across the windshield, since the cleaning liquid supply means provides a cushion of pressurized liquid resulting in a hovercraft effect. Part of the cleaning liquid supplied is continuously discharged from the cavity via the small gap defined between the seal lip and the surface of the windshield. The generator for ultrasonic waves being additionally coupled to this dynamic cushion of cleaning liquid ultrasonic waves are effectively directed to the surface area of the windshield being exposed to the cavity. This results in very effective removal of particles clinging to the surface of the windshield. The removed particles become suspended in the mass of cleaning liquid and are forced out of the cavity together with cleaning liquid. On a subsequent stroke of the wiper blade this liquid together with the suspended particles will be pushed across and from the windshield.

Contrarily, the device disclosed in VDI-Zeitschrift, vol. 110 (1968), pages 781 to 784, requires a closed circuit of cleaning liquid. In this known device particular importance is attached to providing a perfect seal between the seal ring and the surface of the window to avoid leaking. In the windshield wiper system disclosed in German Offenlegungsschrift No. 20 03 912 the space defined between the wiper lips freely communicates with the atmosphere at the upper and lower end thereof. Thus the wiper lips firmly engage the surface of the windshield, while a hovercraft effect is obtained in accordance with the teachings of the present invention. This effect eliminates excessive wear of the wiper lips normally encountered in the very first phase of operating a windshield wiper system when the windshield is dirty and particles of considerable diameter cling thereto.

A further improvement of the present invention is characterized in that the cavity is divided into a plurality of subunits. Such a windshield wiper system is especially suited for use with curved windshields. Even if no complete sealing of one of the subunits of the cavity is obtained in an extremely curved surface portion of the windshield, the other subunits of the cavity still contain intact columns of cleaning liquid adapted to effectively couple ultrasonic energy to the windshield.

A further improvement of the present invention is characterized in that the generator for ultrasonic waves comprises a plurality of ultrasonic transducers. This particular arrangement provides the advantage of supplying ultrasonic energy homogeneously to a surface portion of the windshield while keeping the transverse dimension of the wiper blade small. This is very important in view of keeping the field of vision unrestricted, in view of keeping the weight of the moved parts small and in view of compatibility with prior art wiper blade assemblies.

A further improvement of the present invention is characterized in that the generator for ultrasonic waves comprises a radiating plate. By this particular arrangement also a very homogeneous cleaning effect is obtained. Since the ultrasonic transducer has a large radiating surface, the cleaning liquid supply may still contain a small number of gas bubbles without seriously affecting the transfer of ultrasonic energy. Such gas bubbles are often encountered in the cleaning liquid supplied by a pump, if the cleaning liquid contains additives as detergents or anti-freeze agents.

A further improvement of the present invention is characterized in that acoustically inactive material is arranged at the surface of the generator for ultrasonic waves being remote from the windshield. In operating such a system the generator for ultrasonic waves will require only relatively small power, since only a small amount of ultrasonic energy is radiated into the back space. This reduced power requirement is also important in view of the costs of the HF-generator required.

A further improvement of the present invention is characterized in that the discharge opening of the cleaning liquid supply means communicates with an end portion of the cavity wherein the generator for ultrasonic waves is located. In such a system the cavity is first filled at the end portion thereof containing the ultrasonic transducer. Thus the ultrasonic transducer is rapidly/immersed in a mass of liquid after the cleaning liquid supply means has been en-ergized. Thus a separate timer is dispensable, which otherwise is required to delay energizing of the generator for ultrasonic waves with respect to energizing of the pump of the cleaning liquid supply means.

The invention will now be explained in more detail describing preferred embodiments thereof referring to the enclosed drawings. Therein FIG. 1 shows the front portion of a motor vehicle comprising a windshield wiper system in accordance with the present invention;

Figure 1:
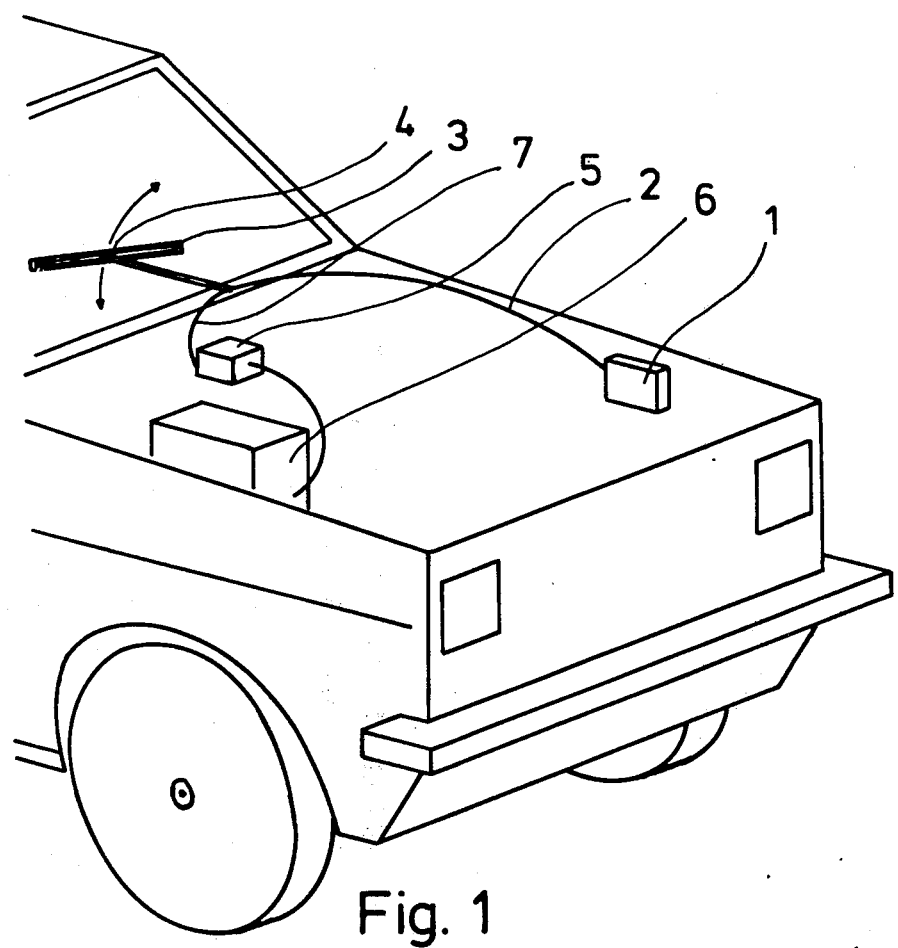

The windshield wiper system shown in FIG. 1 comprises a HF-generator 1 supplying an energizing signal of a frequency of 10 to 50 kHz. The HF-generator is a commercial transistor or thyristor circuit as commonly used for energizing ultrasonic transducers. The HF-generator is connected to an ultrasonic transducer assembly 3, only schematically shown in FIG. 1, via a HF-supply line 2.

Figure 2:
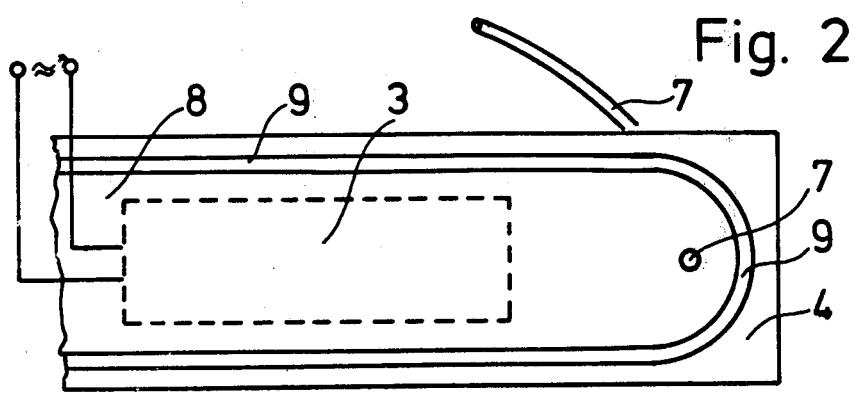
FIG. 2 shows a plan view of a first embodiment of a wiper blade assembly forming part of the windshield wiper system shown in FIG. 1.
Figure 3:
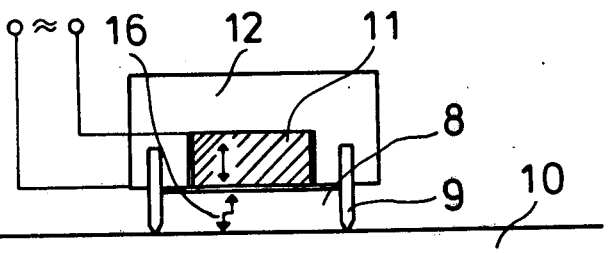
FIG. 3 shows a transverse sectional view of the wiper blade assembly of FIG. 2.

The ultrasonic transducer assembly 3 is arranged within a wiper blade 4 as is shown in more detail in FIG. 2 and 3. The wiper blade 4 is connected to a pump 5 by means of a flexible cleaning liquid supply line 7. The pump 5 is in turn connected to a cleaning liquid reservoir 6.

As may best be seen from FIG. 2 the wiper blade 4 carries a continuous wiper lip 9 having two straight spaced parallel wiper lip portions and two arcuate end portions interconnecting the straight wiper lip portions. The wiper lip 9 thus defines an elongated oval cavity 8 receiving the ultrasonic transducer assembly 3 shown as a single block transducer. The cleaning liquid supply line 7 merges into the cavity 8 at the right hand end thereof as seen in FIG. 2.

As may best be seen from FIG. 3, a mass 12 of acoustically inactive material is arranged at that side of the ultrasonic transducer assembly 3 being remote from a windshield 10 to be cleaned. In FIG. 3 the ultrasonic transducer assembly 3 is shown to comprise a single ultrasonic transducer 11; the mode of vibration thereof has been indicated by a double arrow. The cavity 8 is filled with cleaning liquid and the ultrasonic waves propagating from the transducer 11 towards the surface of the windshield 10 have been schematically indicated by the arrow 16.

The transducer 11 is made from piezo-electric ceramic material. Of course, a magnetostrictive transducer may be used as well. The windshield wiper system described above works as follows:

The pump 5 is energized and simultaneously or somewhat later the drive motor associated to the wiper blade, which is not shown in the drawings, and the HF-generator 1 are energized. Thus the cavity 8 is filled with water to couple ultrasonic energy from the surface of the ultrasonic transducer assembly 3 to the surface of the windshield 10. The alternating sonar pressure provides for cavitation at the surface of the windshield so that particles clinging thereto are effectively detached and suspended in the cleaning liquid.

Part of the cleaning liquid contained in the cavity 8 is continuously squeezed out of the cavity flowing between the free edges of the wiper lips 9 and the surface of the windshield 10. The flow rate may initially by set to a relatively high value to allow movement of the wiper lip over particles clinging to the windshield 10 and to carry away removed particles being suspended in the cleaning liquid in relatively large concentration. When the coarsest particles have been taken away the flow rate may be diminished to a small value. In this second phase of cleaning the windshield the wiper lips engage the surface of the windshield 10 so that a normal wiping effect is obtained, while the column of cleaning liquid contained in the cavity 8 mainly serves to couple the acoustic energy to the surface of the windshield. Thus in this phase there is normal mechanical cleaning of the windshield assisted by ultrasonic cleaning. The pump 5 feeds just an amount of cleaning liquid sufficient to make up the liquid losses from the cavity.

The acoustically inactive material may consist of metal or ceramics. Thus the ultrasonic transducer assembly 3 may comprise a plurality of longitudinally spaced transducers 11.

Figure 4:
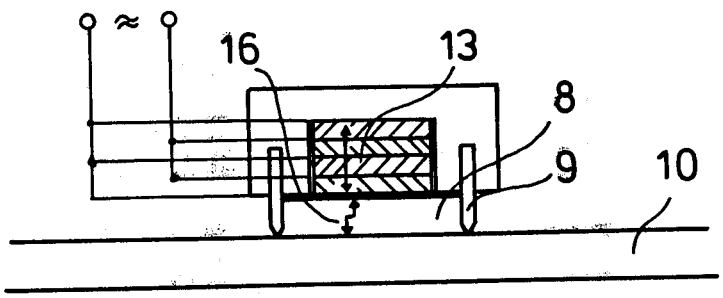
FIG. 4 shows a transverse sectional view of a modified wiper blade assembly.

FIG. 4 shows a compound ultrasonic transducer assembly 13 formed by a plurality of piezo-electric disks fixedly secured together. Feed electrodes of the disks are alternately connected to the terminals of the HF-generator 1.

Figure 5:
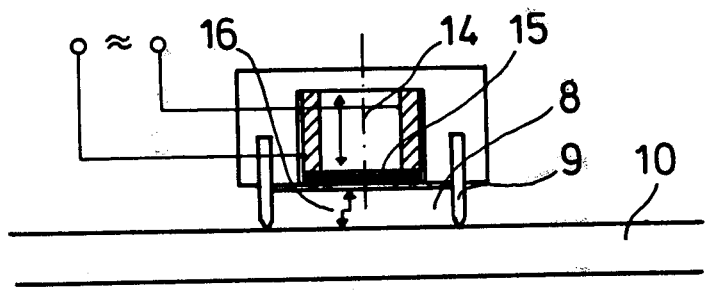
FIG. 5 shows a transverse sectional view of a further modified wiper blade assembly.

In the embodiment shown in FIG. 5 the ultrasonic transducer assembly comprises a plurality of tubular piezo-electric transducers having a radiating plate 15 connected to one end thereof.

I claim:

1. A wiper assembly for a windshield comprising in combination
   (a) a wiper blade member that is adapted to be disposed in an essentially parallel relationship to a windshield,
   (b) a wiper lip mounted on the bottom side of said wiper blade member, said wiper lip being in the form of a continuous seal lip of elongated oval shape that establishes an essentially closed cavity between said wiper blade and said windshield,
   (c) inlet means in said wiper blade member for the introduction of cleaning liquid into the interior of said cavity,
   (d) means for forcing said cleaning fluid into said cavity under a positive pressure that is large enough to cause said liquid to be squeezed outwardly between the lower edge of said continuous seal lip and the windshield, said cavity having no other outlet to remove said cleaning fluid
   (e) an ultrasonic wave generator mounted on said wiper blade member so as to supply ultrasonic waves to the cleaning liquid within said cavity,
   whereby upon the simultaneous (i) introduction of cleaning liquid into said cavity under pressure and (ii) the generation of ultrasonic waves through the liquid within said cavity a cushion of pressurized and ultrasonically vibrated liquid is formed which enables the wiper blade to move over the windshield with a hovercraft effect.

2. The assembly according to claim 1 wherein the generator for ultrasonic waves comprises a plurality of ultrasonic transducers.

3. The assembly according to claim 1 wherein the generator for ultrasonic waves comprises a radiating plate.

4. The assembly according to claim 1 wherein said ultrasonic wave generator is surrounded with an acoustically inactive material.

* * * * *